(12) United States Patent
Haustein et al.

(10) Patent No.: US 9,519,432 B1
(45) Date of Patent: Dec. 13, 2016

(54) SELF-ADJUSTING BACKUP OPERATIONS

(71) Applicant: International Business Machines Corporation, Armonk, NY (US)

(72) Inventors: Nils Haustein, Soergenloch (DE); Joerg Mueller, Horb (DE); Thomas Prause, Rottenburg am Neckar (DE); Michael H. Schlachter, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/739,126

(22) Filed: Jun. 15, 2015

(51) Int. Cl.
*G06F 12/02* (2006.01)
*G06F 3/06* (2006.01)

(52) U.S. Cl.
CPC .............. *G06F 3/0617* (2013.01); *G06F 3/065* (2013.01); *G06F 3/0659* (2013.01); *G06F 3/0683* (2013.01)

(58) Field of Classification Search
CPC .............. G06F 11/1451; G06F 11/1458; G06F 11/1448; G06F 11/1461; G06F 11/1469; G06F 17/30312
See application file for complete search history.

(56) References Cited

U.S. PATENT DOCUMENTS

| | | | |
|---|---|---|---|
| 7,756,833 | B2 | 7/2010 | Van Ingen et al. |
| 8,260,750 | B1 | 9/2012 | Gugick et al. |
| 8,347,048 | B2 | 1/2013 | Palagummi |

FOREIGN PATENT DOCUMENTS

| | | |
|---|---|---|
| CN | 1567262 A | 1/2005 |
| WO | 2012045575 A1 | 4/2012 |

OTHER PUBLICATIONS

IBM et al., "Algorithm for Determining an Optimal Backup Strategy", Original Publication Date: May 1, 1992, Original Disclosure Information: TDB n12 05-92, p. 158-161, IP.com No. 000108271, IP.com Electronic Publication: Mar. 22, 2005, IBM Copyright © 1992, <https://priorart.ip.com/IPCOM/000108271>.
Webb Kristen, Teradactyl, "Sized Based Backup Scheduling with TiBS for AFS (and other topics)", © 2012 Teradactyl LLC, 46 pages.

*Primary Examiner* — Yong Choe
(74) *Attorney, Agent, or Firm* — Isaac J. Gooshaw (57) ABSTRACT

Performing automated and self-adjusting backup operations by executing the following steps: Determining a time of last backup operation for a data block. Obtaining an audit trail based on the time of last backup operation for the data block and a current time. Ordering read operations and write operations of the data block into a chronological sequence based on the audit trail. Generating a weighting element for read operations and a weighting element for write operations of the data block such that a weighting of read operations are greater than or less than the weighting of a write operations. Calculating a weighted sum of weighted read operations and weighted write operations for said data block. Respond to a result of a comparison between the weighted sum and at least one threshold value by performing a type of backup operation.

20 Claims, 3 Drawing Sheets

SELF-ADJUSTING BACKUP OPERATIONS

BACKGROUND OF THE INVENTION

The present invention relates in general to the field of backup environments, and in particular to performing automated and self-adjusting backup operations.

Backup processes are usually denoted by fixed schedules that initiate the backup process of a certain type, e.g., full, differential or incremental backup operations. Full backup operations may become inefficient when they consume large amounts of network resources. In some instances, limited backup storage resources and incremental backup operations can also cause longer recovery times. Changes in large volumes of primary data are vulnerable if the next backup schedule is not scheduled for an extended period.

SUMMARY

Embodiments of the present invention provide a method, system, and program product for performing automated and self-adjusting backup operations. A processor determines a time of last backup operation for a data block. The processor obtains an audit trail based, at least in part, on the time of last backup operation for the data block and a current time. The processor orders one or both of read operations and write operations of the data block into a chronological sequence based on the audit trail. The processor generates a first weighting element for read operations and a second weighting element for write operations of the data block such that a weighting of a given read operation is greater than or less than a weighting of a given write operation. The processor calculates a weighted sum of weighted read operations and weighted write operations for said data block. The processor responds to a result of a comparison between the weighted sum and at least one threshold value by performing a type of backup operation.

BRIEF DESCRIPTION OF THE SEVERAL VIEWS OF THE DRAWINGS

One or more embodiments of the present invention, as described in detail below, are shown in the drawings, in which.

DETAILED DESCRIPTION

One embodiment of the present invention provides a method for performing automated and self-adjusting backup operations. One embodiment of the present invention provides a backup environment. One embodiment of the present invention provides an analysis of primary data accesses and data changes and determines when a backup process of a certain type, i.e. full, differential or incremental backup operation, has to be done.

Accordingly, in an embodiment of the present invention provides a method for performing automated and self-adjusting backup operations in connection with full, incremental and differential backup operations of stored data in a backup environment includes: Determining date and time of last backup operation for a data block; obtaining an audit trail according to the last backup date and time and current date and time; ordering read operations and write operations of the data block in a chronological sequence based on the audit trail; generating a first weighting element for the read operations and a second weighting element for the write operations of the data block, wherein the read operations are weighted differently than the write operations; calculating a weighted sum of the weighted read operations and the weighted write operations for the data block; comparing the weighted sum with at least one threshold value; and performing a corresponding backup operation in response to the comparison result.

In some embodiments of the present invention, the method includes generating a vector comprising the ordered sequence of weighted read operations and weighted write operations, wherein a total number of elements in the vector corresponds to a total number of weighted read operations and weighted write operations of the data block, and wherein the weighted sum is calculated over all elements of the vector.

In some embodiments of the present invention, the first weighting element applied for the read operations is a factor that is a number greater than one. In some embodiments of the present invention, the second weighting element applied for the write operations is an increment that is a number greater than zero.

In some embodiments of the present invention, the stored data to be backed-up includes at least one data area that includes at least one data block. In some embodiments of the present invention, the weighted sum of the weighted read operations and the weighted write operations is calculated over all data blocks of the data area.

In some embodiments of the present invention, the method includes a process of generating a first threshold value and a second threshold value and a third threshold value that each represent a weighted sum of weighted read operations and weighted write operations. In some embodiments of the present invention, the first threshold value is less than the second threshold value that is less than the third threshold value.

In some embodiments of the present invention, generating the threshold values is based on at least one of the following: preconfigured numbers, backup client system utilization, available capacity in backup storage, backup server utilization, and network utilization.

In some embodiments of the present invention, if a) the current weighted sum is less than the first threshold value and b) the weighted sum is stored, then no backup operation is performed.

In some embodiments of the present invention, if the current weighted sum is greater than the first threshold value and less than the second threshold value, then an incremental backup operation is performed.

In some embodiments of the present invention, if the current weighted sum is greater than the second threshold value and less than the third threshold value, then a differential backup operation is performed.

In some embodiments of the present invention, if the current weighted sum is greater than the third threshold value, then a full backup operation is performed.

In some embodiments of the present invention, a record is generated and that includes the date and time of the backup operation, and the weighted sum is reset (i.e., set) to zero after performing one of the backup operations.

In another embodiment of the present invention, a backup environment includes at least one backup client system hosting at least one application, at least one audit component, at least one backup client, and at least one backup analytics module. In some embodiments of the present invention, the at least one backup client system is coupled to at least one backup server system to perform automated and self-adjusting backup operations in connection with full, incremental and differential backup operations of stored data. In some embodiments of the present invention, the backup analytics module is coupled to the audit component and obtains information about sequence and number of read and write operations performed by the application within a certain time range. In some embodiments of the present invention, the backup analytics module is also coupled to said backup client whereby the backup client instructs the backup analytics module to perform an analysis for a given time period and the backup analytics module returns a result of this analysis.

In some embodiments of the present invention, the backup client continuously performs the backup operations without receiving an explicit request or receives a backup request initiated by the backup client system.

In some embodiments of the present invention, a data processing program is provided for execution in a data processing system includes software code portions such that when the program is run on the data processing system the data processing system that follows the aforementioned method for performing automated and self-adjusting backup operations.

In some embodiments of the present invention, a computer program product is stored on a computer-readable medium is provided that includes computer-readable programming that follows the aforementioned method such that a computing device executing that programming performs automated and self-adjusting backup operations.

Embodiments of the present invention recognize the utility of making automated decisions when a backup process of a type is to be executed, i.e. full, differential or incremental backup operation. Embodiments of the present invention recognize analyzing primary data accesses and changes to that data in order to make such automated decisions. Embodiments of the present invention recognize obtaining audit trails from an audit components and analyzing data accesses, i.e. create, read, write and delete operations, in order to make such decisions. Thus, embodiments of the present invention provide a backup process with increased flexibility when compared to other known solutions. Embodiments of the present invention provide an increase in the efficiency of resource usage. Embodiments of the present invention provide a reduction in the risk of losing data. Furthermore, embodiments of the present invention provide a recovery process with increased efficiency in regards to performance because full backup operations are triggered based on the amount of changes to the stored data being above a threshold amount.

Some embodiments of the present invention employ a backup environment including backup client systems each having a backup client. Some embodiments of the present invention provide backup clients that perform backup operations. Some embodiments of the present invention provide backup clients that are coupled to a backup analytics module that performs analysis of an audit trail. Some embodiments of the present invention provide a backup analytics module that is coupled to an application audit component in order to obtain information about read and write operations within a certain time period. Some embodiments of the present invention provide a backup analytics module that is configured to determine a time and a type of the next backup operation.

In a typical backup environment backup clients back up primary data managed by applications from a respective client system to a backup server system via a network. There are different types of applications such as file systems managing files, databases managing tables and records, hypervisors managing virtual machines and much more. Backup clients are typically integrated with the application in order to access the data and copy it to the backup server system in a consistent manner.

The backup server system hosts backup software that receives the backup data, stores it in a backup storage and manages the lifecycle of the backup data. The backup storage may be represented by different types of storage such as disk, tape, optical and flash. The backup server system may also have the capability to move the backup data from one storage medium to another during the data lifecycle. The lifecycle of backup data may be characterized by a number of versions to be kept and a retention times for inactive versions.

The backup process backs up data according to the backup type. There are different types of backup operations such as full backup operation, i.e. all data is backed up, differential backup operation, i.e. data is backed up that has changed since the last full backup, and/or incremental backup operation, i.e. data is backed up that has changed since the last full, differential or incremental backup operation.

The backup process is typically performed automatically by schedules. The schedules may be triggered by the backup clients or by the backup server system or by an external scheduler. When the backup schedule is triggered the backup client copies all or subsets of data to the backup server according to the backup process type.

The types of backup operations often have different advantages and disadvantages. A full backup operation copies all data according to the backup scope to the backup server system. This utilizes a large amount of processing resources on the backup client systems, the network and the backup server system. On the other hand the restore of a full backup is quick because all data is sequentially stored on the backup server system.

The incremental backup does not utilize large amounts of processing resources on the backup client systems, the network and the backup server because it only copies subsets of data. However, the restore time from incremental backup operations is higher because the subsets of data are not stored sequentially in the backup server system. During the restore process, the server has to determine where the latest version of data resides for each file. Because these files might have been backed up in multiple incremental backup sessions over multiple days, the last versions of multiple files can be spread across the backup server system. In general, files backed up in multiple incremental backup processes are not stored sequentially in the backup server system.

A difficulty can arise when a backup operation is combined with a fixed schedule. For example, in one combination a full backup is scheduled every Sunday and an incremental backup is scheduled each day. However, such combinations do not consider the amount of changes made to the data being backed-up. For example, if a large amount of business relevant data has changed within a certain period of time, e.g. on Tuesday, it might be advantageous to run a full backup immediately, thereby reducing the risk of data loss due to failures and to facilitate a fast recovery, instead of waiting for the next full backup schedule.

Another difficulty can arise from fixed backup schedules wasting backup storage and network resources. For example, if data is changed that was not read since the last full backup operation, it might be more efficient, resource wise, to backup up this data by an incremental backup operation and to delay the full backup operation, thereby saving storage and network resources. Alternatively, the backup operation of some data, e.g., high value data, can be scheduled for an earlier point in time.

In some embodiments, the above mentioned applications—such as databases, file systems, hypervisors—include audit components. In some embodiments, the audit component tracks and records the access (read and write) to data which is stored in a storage system and managed by the application in an audit trail. In some embodiments, this tracking includes the sequence of create, read, write and delete operations to the data for a given time period. In some embodiments, based on this sequence the number of such operations within the given time period can be derived.

In some embodiments, an audit component is included in an operating system. For example an operating system includes an audit daemon that is configured to track and record access (create, read, write, delete) to files in a certain file system.

In some embodiments, relational database systems use an audit component to track read and write operations of data block to be able to create the database redo log files. In some embodiments, audit components of relational databases have an Application Programming Interface (API) which can be used by another program to retrieve the recorded audit information.

In some embodiments, hypervisors also have audit components tracking and logging changed data blocks of virtual machines. In some embodiments, the audit components of hypervisors have an Application Programming Interfaces (API) allowing an external application to query the recorded audit information.

The present invention will now be described in detail with reference to the Figures.

Figure 1:
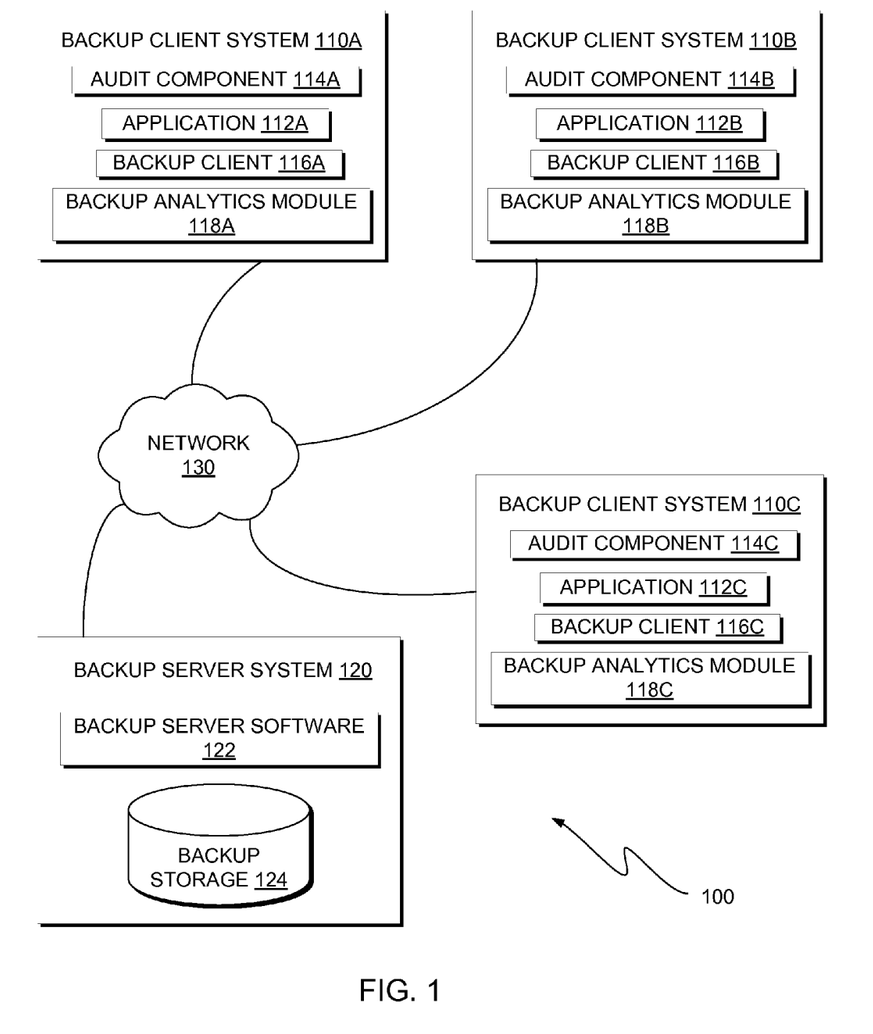
FIG. 1 is a functional block diagram illustrating a backup environment, in accordance with an exemplary embodiment of the present invention.

FIG. 1 is a functional block diagram illustrating a backup environment, generally designated 100, in accordance with one embodiment of the present invention. The depicted backup environment 100 includes backup client system 110A, backup client system 110B, backup client system 110C, and backup server system 120 all interconnected over network 130. Backup server system 120 includes backup server software 122, and backup storage 124. Backup storage 124 is a data storage device. Backup server software 122 is, in one embodiment, a general purpose server software that is configured to carry out backup operations as directed by backup client system 110A, backup client system 110B, and backup client system 110C. As such, backup server software 122 determines and reports the storage capacity of the backup storage 124 to backup client system 110A, backup client system 110B, backup client system 110C. Also, when directed by backup client system 110A, backup client system 110B, and backup client system 110C, backup server software 122 stores data blocks to backup storage 124.

In general, application 112A, 112B, 112C, audit component 114A, 114B, 114C, backup client 116A, 116B, 116C, backup analytics module 118A, 118B, 118C, and backup server software 122 respectively include the functionality to carry out various processes according to an embodiment of the present invention as described hereinafter. In some embodiments, application 112A, 112B, 112C, audit component 114A, 114B, 114C, backup client 116A, 116B, 116C, backup analytics module 118A, 118B, 118C, backup server software 122 include one or both of software and hardware that is configured to provide this functionality according to an embodiment of the present invention.

As shown in FIG. 1, backup client system 110A hosts application 112A, backup client system 110B hosts application 110B, and backup client system 110C hosts application 112C. In one embodiment, applications 112A, 112B, and 112C manage data to be backed up within backup environment 100. Backup client system 110A also hosts audit component 114A, backup client 116A, and analytics module 118A. Backup client system 110B also hosts audit component 114B, backup client 116B, and analytics module 118B. Backup client system 110C also hosts audit component 114C, backup client 116C, and analytics module 118C.

In general, backup client system 110A, backup client system 110B, backup client system 110C, and backup server system 120 work in concert to perform automated and self-adjusting backup operations in connection with full, incremental and differential backup operations of stored data in a data area.

As used herein, a data area comprises at least one data block including data managed by application 112A, 112B, 112C. A data block is an atomic representation of data according to the data type. For example, if the data type corresponds to files stored in a file system then each file is comprised of data blocks. In some scenarios and embodiments, a data area includes one or more data blocks for one or more files in a file system. In some scenarios and embodiments, if the backup operation is to be performed for an entire file system, then the data area includes all data blocks used by files in the file system. In some scenarios and embodiments, if the data type corresponds to a database, then the database is comprised of records representing a database table. As such, in some scenarios and embodiments, data area for a database comprises one or more records, for example all records representing one or more tables.

Still referring to FIG. 1, each of the backup analytics modules 118A, 118B, 118C is coupled to a corresponding audit component 114A, 114B, 114C to obtain an audit trail including information about sequence and number of read and write operations performed by the application 112A, 112B, 112C within a certain time range for a given data area. These couplings might be implemented by means of inter-process communication (Remote Procedure Calls), message queues or other means of communication within a client-server-system according to prior art. Each of the backup analytics modules 118A, 118B, 118C is also coupled to a corresponding backup client 116A, 116B, 116C whereby the backup client 116A, 116B, 116C instructs the backup analytics module 118A, 118B, 118C to perform an analysis for a given time period and the backup analytics module 118A, 118B, 118C returns a result of this analysis. Based on the result of the analysis the backup client 116A, 116B, 116C performs a backup operation of the data area corresponding to a certain type, which can be no backup operation, an incremental backup operation, a differential backup operation or a full backup operation.

In another embodiment the backup analytics module 118A, 118B, 118C performs the analysis of the audit trail continuously and informs the corresponding backup client 116A, 116B, 116C about the type of backup operation to be performed. In one such embodiment, the backup client then performs this backup operation type for the data area.

Figure 2:
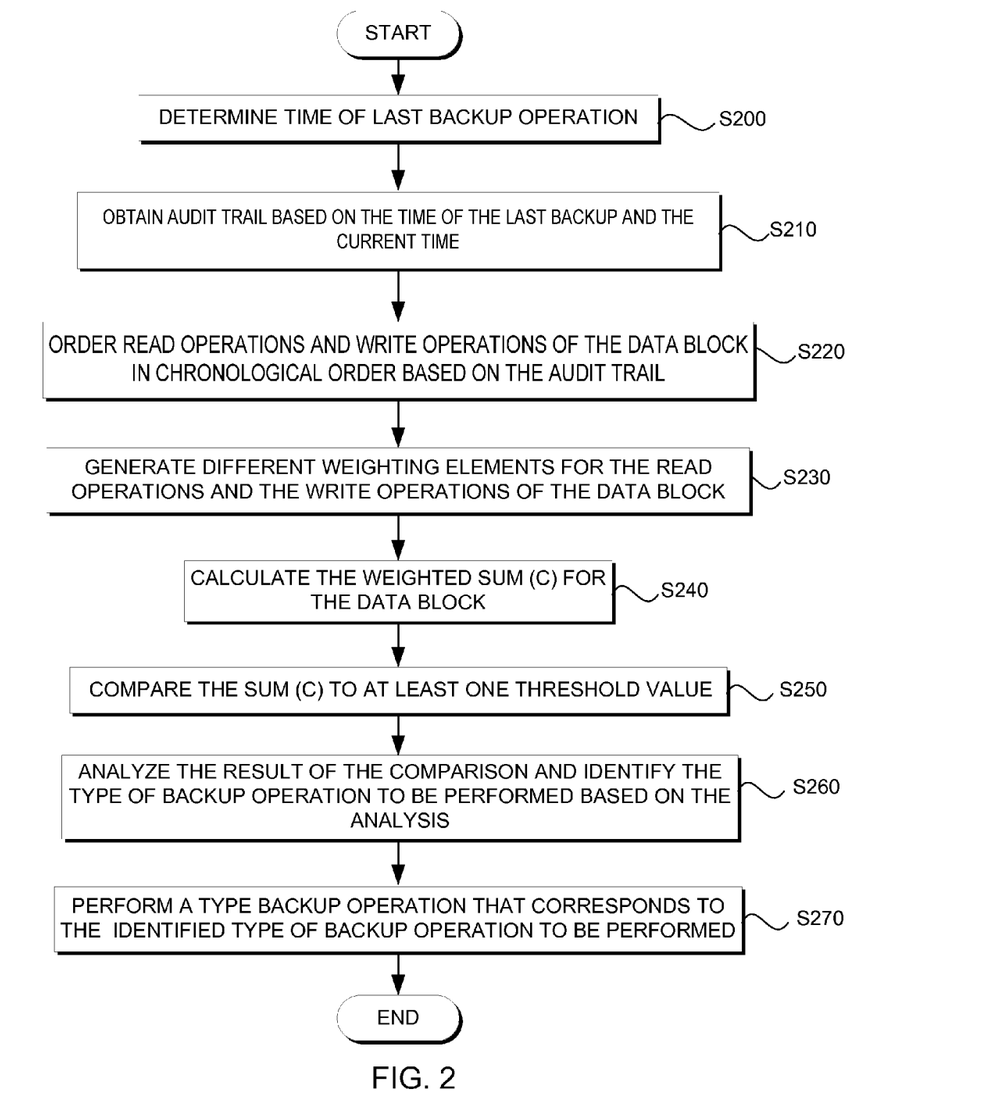
FIG. 2 is a schematic flow diagram of a method for performing automated and self-adjusting backup operations, in accordance with an exemplary embodiment of the present invention.

In one embodiment, backup environment 100 is configured to perform a method for performing automated and self-adjusting backup operations in connection with full, incremental and differential backup operations of stored data in a data area, shown in FIG. 2.

Referring to FIG. 2, after starting the method for performing automated and self-adjusting backup operations, a date and time of the last backup operation for a data block is determined, in process S200. In one embodiment, the processes included in S200 are executed by one or both of the backup analytics module 118A, 118B, 118C and the backup client 116A, 116B, 116C. In process S210, an audit trail according to the last backup date and time and current date and time for the data block is obtained by the backup analytics module 118A, 118B, 118C querying the audit component 114A, 114B, 114C. In process S220, read operations and write operations of a data block are ordered in a chronological sequence based on the audit trail by the backup analytics module 118A, 118B, 118C. In process S230, a first weighting element for the read operations and a second weighting element for the write operations of the data block are generated by the backup analytics module 118A, 118B, 118C, wherein the read operations are weighted differently than the write operations. In process S240, the backup analytics module 118A, 118B, 118C, calculates a weighted sum (C) of the weighted read operations and the weighted write operations, for the data block. In process S250, the weighted sum (C) is compared with at least one threshold value T1, T2, T3. In process S260, a result of the comparison performed in process S250 is analyzed and, based on that analysis, backup analytics module 118A, 118B, 118C identify the type of backup operation to be performed. In process S270, backup client 116A, 116B, 116C perform a type of backup operation on the data block that corresponds to the type of backup operation that was identified in process S260.

Referring to FIGS. 1 and 2, backup environment 100 is configured to perform a method to determine automatically the start time and type of the next backup operation. In one such embodiment and scenario, backup client 116A, 116B, 116C receives a backup request. The backup request could be, for example, initiated by the backup server system 120 or by another means of scheduling. In an alternate embodiment, the backup operations are continuously performed without receiving an explicit request for backup. In one such embodiment and scenario, backup analytics module 118A, 118B, 118C continuously obtains and analyzes the audit trail as described above and sends to backup client 116A, 116B, 116C information indicating the type of backup operation to be performed for a given data block.

In one embodiment, backup analytics module 118A, 118B, 118C requests and obtains information about the sequence of read and write operations from the audit component 114A, 114B, 114C and stores the sequence of read and write operations in a vector V. As such, in some embodiments, each element in the vector V represents a read or write operation. In one embodiment, each element of the vector V represents the number of consecutive read and write operations. As such, in some embodiments, backup analytics module 118A, 118B, 118C determine the total number of read and write operations Z, which is also the number of elements in vector V.

In some embodiments, backup analytics modules 118A, 118B, and 118C now determine the weighted sum C of all weighted read operations and weighted write operations of vector V according to equation (1).

$$C = \sum_{i=0}^{Z} C_i \quad (1)$$

$C_i$ is calculated in accordance to the type of the element of the vector V.

If i-th element of the vector V represents a write operation, then i-th element of the vector V is calculated according to equation (2).

$$C_i = C_{i-1} + P \quad (2)$$

If i-th element of the vector V represents a read operation then i-th element of the vector is calculated according to equation (3).

$$C_i = C_{i-1} * M \quad (3)$$

In various embodiments, the increment P applied for write operations is a number greater than 0 and the factor M applied for the read operations is a number greater than 1.

Since read operations are weighted with a factor it becomes obvious that a read operation, without any write operations, will not cause an increase in the weighted sum C. Hence, in one embodiment and scenario, in response to a large number of read operations and no write operations being performed to a data block, a backup operation is not performed because the data block has not changed. However, if at least one write operation has been performed on the data block subsequent to one or more read operations, then the weighted sum C will increase and, assuming a continued increase in the weighted sum C, eventually trigger a backup operation when the weighted sum C exceeds a threshold.

In one embodiment, the importance or value of a given data block is determined based on the number of read operations being performed on it. In some cases and embodiments, the number of read operations is taken in context with the time over which those read operations were made. For example, a data block with twenty read operations over a period of ten minutes would have a higher value rating than a similar data block that has twenty read operations over five hours. In general, as more read operations are performed on such data blocks, the greater the likelihood becomes for a backup operation being triggered because the data block being read is deemed to be valuable, and thus, should be protected using a backup operation.

In one embodiment, backup analytics module 118A, 118B, 118C, or alternatively backup client 116A, 116B, 116C, determines threshold values T1, T2, T3 whereby a first threshold value T1 is less than a second threshold value T2 which is less than a third threshold value T3. In some embodiments, threshold values T1, T2, T3 may be preconfigured in backup analytics module 118A, 118B, 118C. In general, threshold values T1, T2, T3 each represent a weighted sum of weighted read and write operations.

In another embodiment, threshold values T1, T2, T3 are determined in accordance to the utilization of the backup client system 110A, 110B, 110C. In one such embodiment, the system utilization of a backup client system 110A, 110B, 110C includes but is not limited to the utilization of the CPU, memory (RAM) and disk drive and can be determined with known methods according to, for example, system utilities like top or nmon. In general, the greater the utilization of backup client system 110A, 110B, 110C the greater the second threshold value T2 and the third threshold value T3 become. In some embodiments, such proportional increases assures that with high system utilization (>90%) that an incremental backup operation is more likely to be performed than a differential backup operation, which, in turn, is more likely to be performed than full backup operation. In some embodiments and scenarios, an incremental backup operation is less resource (utilization) intensive than, for example, a differential backup operation, which, in turn, are less resource intensive than full backup operations. In general, in some embodiments and scenarios, if the system utilization is low (<50%), then the third threshold value T3 is also low and a full backup operation is more likely to be performed, which consumes more system resources than are available at that point in time. However, a full backup operation facilitates a faster recovery operation.

In another embodiment, threshold values T1, T2, T3 are determined in accordance to the utilization of the backup server system 120. In some embodiments, system utilization of a backup server system 120 includes but is not limited to the utilization of the CPU, memory (RAM) and disk drive and can be determined with known methods according to, for example, system utilities like top or nmon. In general, the greater the utilization of backup server system 120 the greater the second threshold value T2 and the third threshold value T3 become. In some embodiments, such proportional increases assures that with high utilization of backup server system 120 (>90%) that an incremental backup operation is more likely to be performed than a differential backup operation, which, in turn, is more likely to be performed than full backup operation. In some embodiments and scenarios, an incremental backup operation is less resource (utilization) intensive than, for example, a differential backup operation, which, in turn, are less resource intensive than full backup operations. In general, in some embodiments and scenarios, if the utilization of backup server system 120 is low (<50%), then the third threshold value T3 is also low and a full backup operation is more likely to be performed, which consumes more system resources than are available at that point in time. However, a full backup operation facilitates a faster recovery operation.

In another embodiment of the present invention the threshold values T1, T2, T3 are determined in accordance to the utilization of the network 130 between the backup client systems 110A, 110B, 110C and the backup server systems 120. The network utilization of a network 130 includes but is not limited to the number of packages sent and received by the network 130 and can be determined with real time network performance monitoring methods according to prior art. In general, the greater the utilization of network 130 the greater the second threshold value T2 and the third threshold value T3 become. In some embodiments, such proportional increases assures that with high network utilization (>90%) that an incremental backup operation is more likely to be performed than a differential backup operation, which, in turn, is more likely to be performed than full backup operation. In some embodiments and scenarios, an incremental backup operation is less high network utilization intensive than, for example, a differential backup operation, which, in turn, are less high network utilization intensive than full backup operations. In general, in some embodiments and scenarios, if the high network utilization is low (<50%), then the third threshold value T3 is also low and a full backup operation is more likely to be performed, which consumes more network bandwidth. However, a full backup operation facilitates a faster recovery operation.

In one embodiment, thresholds T1, T2, T3 are determined according to the available storage capacity of the backup storage 124 in the backup server system 120. For example if the available storage capacity is less than 20%, then the third threshold value T3 is much higher than the first threshold value T1, which decreases the likelihood that a full backup operation will be executed, since the full backup operation requires much more storage capacity in backup server system 120 than an incremental backup operation or a differential backup operation. In contrast, if the available storage capacity is more than 50%, then the third threshold value T3 is lower, thereby increasing the likelihood for a full backup operation.

In one embodiment, backup analytics module 118A, 118B, 118C compares the current weighted sum C to the threshold values T1, T2, T3 in order to derive the type of backup operation to be performed.

In one embodiment, if the current weighted sum C is less than the first threshold T1 (C<T1), then the backup operation type is set to "no backup operation".

In one embodiment, if the current weighted sum C is greater than the first threshold value T1 and less than the second threshold value T2 (T1<C<T2), then the backup operation type is set to "incremental backup operation". In general, during the incremental backup operation, only data blocks of a corresponding data area are backed-up, since they have been changed since the last backup operation.

In one embodiment, if the current weighted sum C is greater than the second threshold value T2 and less than the third threshold value T3 (T2<C<T3), then the backup operation type is set to "differential backup operation". In general, in such embodiments and scenarios, during the differential backup operation, only data blocks of a corresponding data area are backed up, since they have been changed since the last full backup operation.

In one embodiment, if the current weighted sum C is greater than the third threshold value T3 (C>T3), then the backup operation type is set to "full backup operation". In one such embodiment and scenario, during the full backup operation, all data blocks of a corresponding data area are backed up.

In one embodiment, backup analytics module 118A, 118B, 118C informs backup client 116A, 116B, 116C to perform a type of backup operation, which has been determined.

In one embodiment, backup analytics module 118A, 118B, 118C informs the backup client 116A, 116B, 116C about the calculated weighted sum C and a backup client determines which type of backup operation to perform by comparing the weighted sum C against the threshold values T1, T2, T3 and making the determination based on a result of the comparison.

In one embodiment, if one of the backup operations "incremental backup operation", "differential backup operation" or "full backup operation" has been performed, then the start date and time of the backup operation is stored by backup analytics module 118A, 118B, and 118C as the last backup time and the previous weighted sum C is set to zero.

In one embodiment, backup client 116A, 116B, 116C performs the backup operation according to an indicated type of backup operation to be performed. If the type of backup operation is "no backup", then backup client 116A, 116B, 116C do not perform a backup operation. Further, if the backup operation type is "no backup", then backup analytics module 118A, 118B, 118C store the weighted sum C for the next cycle as $C_{old}$.

In one embodiment, the values for P, M and T1, T2 and T3 may be varied for different purposes and such variances may depend on the usage pattern of the database system.

Embodiments of the present invention have been described in accordance to stored data to be backed up comprising just one data block. In one alternative embodiment, the stored data to be backed up includes at least one data area that has more than one data block, wherein said weighted sum C of the weighted read operations and the weighted write operations is calculated over all data blocks of the corresponding data area. Further, in one such embodiment, the first threshold value T1 and the second threshold value T2 and the third threshold value T3 are generated for a total sum C of the weighted read operations and the weighted write operations over all data blocks of the corresponding data area.

In various embodiments of the present invention, one or more of backup server system 120 and backup client systems 110A, 110B, and 110C are, respectively, a type of computing device. Such a computing device can be a standalone device, a server, a laptop computer, a tablet computer, a netbook computer, a personal computer (PC), or a desktop computer. In another embodiment, one or more of backup server system 120 and backup client systems 110A, 110B, and 110C represent a computing system utilizing clustered computers and components to act as a single pool of seamless resources. In general, one or more of backup server system 120 and backup client systems 110A, 110B, and 110C can be any computing device or a combination of devices with access to application 112A, 112B, 112C, audit component 114A, 114B, 114C, backup client 116A, 116B, 116C, backup analytics module 118A, 118B, 118C, backup server software 122, and network 130 and is capable of executing the processes described with references to FIGS. 1 and 2. One or more of backup server system 120 and backup client systems 110A, 110B, and 110C may include internal and external hardware components, as depicted and described in further detail with respect to FIG. 3.

In this exemplary embodiment, application 112A, 112B, 112C, audit component 114A, 114B, 114C, backup client 116A, 116B, 116C, backup analytics module 118A, 118B, 118C, and backup server software 122, are respectively stored on one or more of backup server system 120 and backup client systems 110A, 110B, and 110C. However, in other embodiments, application 112A, 112B, 112C, audit component 114A, 114B, 114C, backup client 116A, 116B, 116C, backup analytics module 118A, 118B, 118C, and backup server software 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between backup server system 120 and backup client systems 110A, 110B, and 110C and application 112A, 112B, 112C, audit component 114A, 114B, 114C, backup client 116A, 116B, 116C, backup analytics module 118A, 118B, 118C, and backup server software 122, in accordance with a desired embodiment of the present invention.

Figure 3:
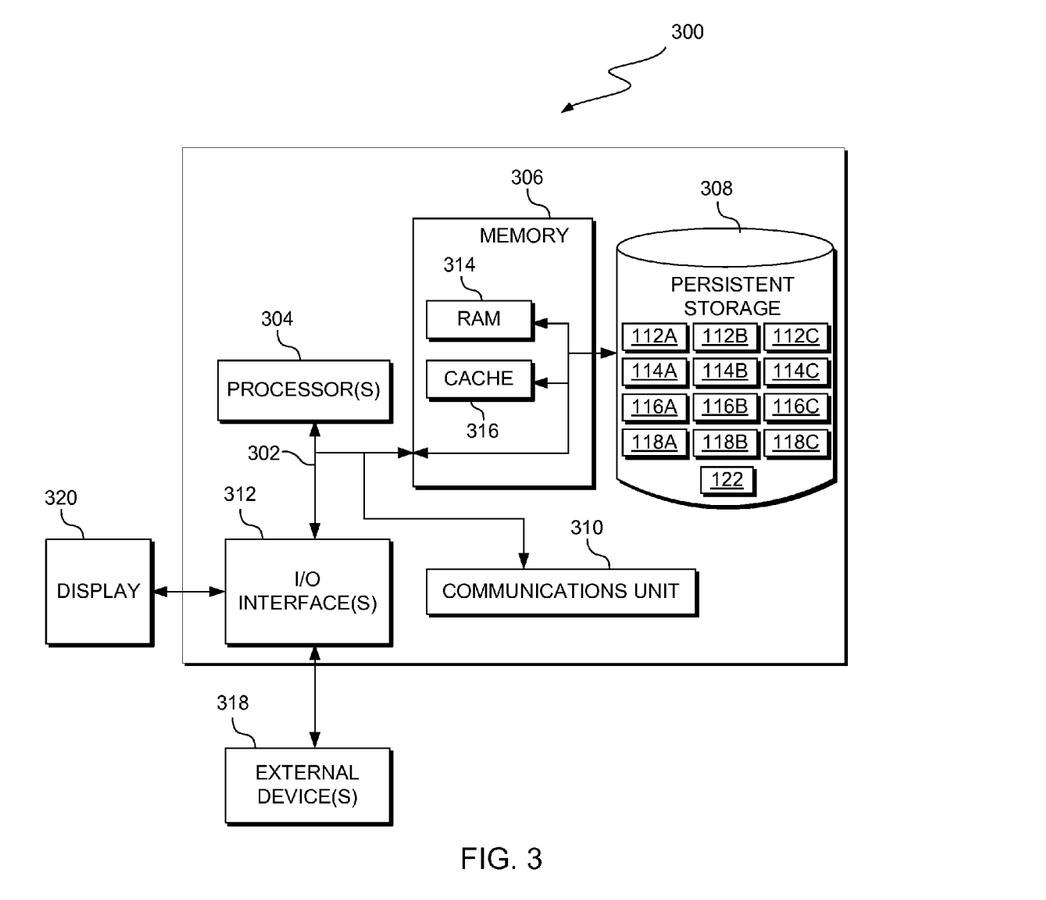
FIG. 3 depicts a block diagram of components of a backup server system and backup client systems of FIG. 1, in accordance with an exemplary embodiment of the present invention.

FIG. 3 depicts a block diagram, 300, of components of backup server system 120 and backup client systems 110A, 110B, and 110C, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Backup server system 120 and backup client systems 110A, 110B, and 110C respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

One or more of application 112A, 112B, 112C, audit component 114A, 114B, 114C, backup client 116A, 116B, 116C, backup analytics module 118A, 118B, 118C, and backup server software 122 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. One or more of application 112A, 112B, 112C, audit component 114A, 114B, 114C, backup client 116A, 116B, 116C, backup analytics module 118A, 118B, 118C, and backup server software 122 may be downloaded to persistent storage 308 through communications unit 310.

I/O interface(s) 312 allows for input and output of data with other devices that may be connected to one or more of backup server system 120 and backup client systems 110A, 110B, and 110C. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., application 112A, 112B, 112C, audit component 114A, 114B, 114C, backup client 116A, 116B, 116C, backup analytics module 118A, 118B, 118C, and backup server software 122, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational process to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain terms used herein may be subject to trademark rights in various jurisdictions throughout the world and are used here only in reference to the products or services properly denominated by the marks to the extent that such trademark rights may exist.

What is claimed is:

1. A method of performing automated and self-adjusting backup operations, the method comprising:
    determining, by a processor, a time of last backup operation for a data block;
    obtaining, by the processor, an audit trail based, at least in part, on the time of last backup operation for the data block and a current time;
    ordering, by the processor, one or both of read operations and write operations of the data block into a chronological sequence based on the audit trail;
    generating, by the processor, a first weighting element for read operations and a second weighting element for write operations of the data block such that a weighting of a given read operation is greater than or less than a weighting of a given write operation;
    calculating, by the processor, a weighted sum of weighted read operations and weighted write operations for said data block; and
    responsive to a result of a comparison between the weighted sum and at least one threshold value, performing, by the processor, a type of backup operation.

2. The method of claim 1, the method further comprising:
    generating, by the processor, a vector that includes an ordered sequence of weighted read operations and weighted write operations, wherein a total number of elements in the vector correspond to a total number of weighted read operations and weighted write operations of the data block, and wherein the weighted sum is calculated over all elements of the vector.

3. The method according to claim 1, wherein the first weighting element is a factor that is a number greater than one, and wherein the second weighting element is an increment that is a number greater than zero.

4. The method according to claim 1, the method comprising:
    identifying, by the processor, a stored data to be backed up that includes at least one data area that has at least one data block, wherein the weighted sum of weighted read operations and weighted write operations is calculated over all data blocks of the data area.

5. The method according to claim 1, the method further comprising:
    generating, by the processor, a first threshold value that represents a first weighted sum of weighted read operations and weighted write operations, a second threshold value representing a second weighted sum of weighted read operations and weighted write operations, and a third threshold representing a third weighted sum of weighted read operations and weighted write operations, wherein the first threshold value is less than the second threshold value which is less than the third threshold value.

6. The method according to claim 5, wherein threshold values are generated based on at least one of preconfigured numbers, backup client system utilization, available capacity in backup storage, backup server utilization, and network utilization.

7. The method according to claim 5, the method further comprising:
    wherein the type of backup operation is one of i) a full backup operation, ii) an incremental backup operation, or iii) a differential backup operation;
    responsive to the result of a comparison between the weighted sum and at least two threshold values, executing, by the processor, at least one of:
        i) responsive to a determination that the weighted sum is greater than the first threshold value and less than the second threshold value, performing, by the processor, an incremental backup operation for the data block;
        ii) responsive to a determination that the weighted sum is greater than the second threshold value and less than the third threshold value, performing, by the processor, a differential backup operation for the data block; and
        iii) responsive to a determination that the weighted sum is greater than the third threshold value, performing, by the processor, a full backup operation for the data block;
    storing, by the processor, a time of execution of the type of backup operation; and
    setting, by the processor, the weighted sum to zero after performing the type of backup operation.

8. A computer program product for performing automated and self-adjusting backup operations, the computer program product comprising:
    one or more computer-readable storage media and program instructions stored on the one or more computer-readable storage media, the program instructions comprising:
        program instructions to determine a time of last backup operation for a data block;
        program instructions to obtain an audit trail based, at least in part, on the time of last backup operation for the data block and a current time;
        program instructions to order one or both of read operations and write operations of the data block into a chronological sequence based on the audit trail;
        program instructions to generate a first weighting element for read operations and a second weighting element for write operations of the data block such that a weighting of a given read operation is greater than or less than a weighting of a given write operation;
        program instructions to calculate a weighted sum of weighted read operations and weighted write operations for said data block; and
        program instructions to respond to a result of a comparison between the weighted sum and at least one threshold value by performing a type of backup operation.

9. The computer program product of claim 8, the program instructions further comprising:
    program instructions to generate a vector that includes an ordered sequence of weighted read operations and weighted write operations, wherein a total number of elements in the vector correspond to a total number of weighted read operations and weighted write operations of the data block, and wherein the weighted sum is calculated over all elements of the vector.

10. The computer program product according to claim 8, wherein the first weighting element is a factor that is a number greater than one, and wherein the second weighting element is an increment that is a number greater than zero.

11. The computer program product according to claim 8, the program instructions comprising:
   program instructions to identify a stored data to be backed up that includes at least one data area that has at least one data block, wherein the weighted sum of weighted read operations and weighted write operations is calculated over all data blocks of the data area.

12. The computer program product according to claim 8, the program instructions further comprising:
   program instructions to generate a first threshold value that represents a first weighted sum of weighted read operations and weighted write operations, a second threshold value representing a second weighted sum of weighted read operations and weighted write operations, and a third threshold representing a third weighted sum of weighted read operations and weighted write operations, wherein the first threshold value is less than the second threshold value which is less than the third threshold value.

13. The computer program product according to claim 12, wherein threshold values are generated based on at least one of preconfigured numbers, backup client system utilization, available capacity in backup storage, backup server utilization, and network utilization.

14. The computer program product according to claim 12, the program instructions further comprising:
   wherein the type of backup operation is one of i) a full backup operation, ii) an incremental backup operation, or iii) a differential backup operation;
   program instructions to respond to the result of a comparison between the weighted sum and at least two threshold values, executing, by the processor, at least one of:
      i) program instructions to respond to a determination that the weighted sum is greater than the first threshold value and less than the second threshold value, by performing an incremental backup operation for the data block;
      ii) program instructions to respond to a determination that the weighted sum is greater than the second threshold value and less than the third threshold value, by performing a differential backup operation for the data block; and
      iii) program instructions to respond to a determination that the weighted sum is greater than the third threshold value, by performing a full backup operation for the data block;
   program instructions to store a time of execution of the type of backup operation for the data block; and
   program instructions to set the weighted sum to zero after performing the type of backup operation.

15. A computer system for performing automated and self-adjusting backup operations, the computer system comprising:
   one or more computer processors;
   one or more computer readable storage medium;
   program instructions stored on the computer readable storage medium for execution by at least one of the one or more processors, the program instructions comprising:
      program instructions to determine a time of last backup operation for a data block;
      program instructions to obtain an audit trail based, at least in part, on the time of last backup operation for the data block and a current time;
      program instructions to order one or both of read operations and write operations of the data block into a chronological sequence based on the audit trail;
      program instructions to generate a first weighting element for read operations and a second weighting element for write operations of the data block such that a weighting of a given read operation is greater than or less than a weighting of a given write operation;
      program instructions to calculate a weighted sum of weighted read operations and weighted write operations for said data block; and
      program instructions to respond to a result of a comparison between the weighted sum and at least one threshold value by performing a type of backup operation.

16. The computer system of claim 15, the program instructions further comprising:
   program instructions to generate a vector that includes an ordered sequence of weighted read operations and weighted write operations, wherein a total number of elements in the vector correspond to a total number of weighted read operations and weighted write operations of the data block, and wherein the weighted sum is calculated over all elements of the vector.

17. The computer system of claim 15, wherein the first weighting element is a factor that is a number greater than one, and wherein the second weighting element is an increment that is a number greater than zero.

18. The computer system of claim 15, the program instructions comprising:
   program instructions to identify a stored data to be backed up that includes at least one data area that has at least one data block, wherein the weighted sum of weighted read operations and weighted write operations is calculated over all data blocks of the data area.

19. The computer system of claim 15, the program instructions further comprising:
   program instructions to generate a first threshold value that represents a first weighted sum of weighted read operations and weighted write operations, a second threshold value representing a second weighted sum of weighted read operations and weighted write operations, and a third threshold representing a third weighted sum of weighted read operations and weighted write operations, wherein the first threshold value is less than the second threshold value which is less than the third threshold value.

20. The computer system of claim 19, the program instructions further comprising:
   wherein the type of backup operation is one of i) a full backup operation, ii) an incremental backup operation, or iii) a differential backup operation;
   program instructions to respond to the result of a comparison between the weighted sum and at least two threshold value, executing, by the processor, at least one of:
      i) program instructions to respond to a determination that the weighted sum is greater than the first threshold value and less than the second threshold value, by performing an incremental backup operation for the data block;
      ii) program instructions to respond to a determination that the weighted sum is greater than the second threshold value and less than the third threshold value, by performing a differential backup operation for the data block; and iii) program instructions to respond to a determination that the weighted sum is greater than the third threshold value, by performing a full backup operation for the data block;

program instructions to store a time of execution of the type of backup operation for the data block; and program instructions to set the weighted sum to zero after performing the type of backup operation.

\* \* \* \* \*